STABILIZED ANTIBIOTIC IN LIQUID RUMINANT FEED SUPPLEMENT

Frank M. Snyder, Omaha, Nebr., and Stephen L. Hallows, Lucerne, Colo., assignors to Allied Chemical Corporation, New York, N.Y., a corporation of New York
No Drawing. Continuation-in-part of application Ser. No. 767,514, Oct. 14, 1968. This application June 13, 1969, Ser. No. 833,143
Int. Cl. A61k 21/00
U.S. Cl. 424—38          5 Claims

ABSTRACT OF THE DISCLOSURE

The stability of antibiotics in liquid ruminant feed supplements is improved by prior coating of the antibiotic with a liquid hydrocarbon wax. An oil-in-water emulsifier is incorporated in the coating to increase the effectiveness of the antibiotic in the rumen.

CROSS-REFERENCE TO RELATED APPLICATIONS

This application is a continuation-in-part of our co-pending application Ser. No. 767,514, filed Oct. 14, 1968, now abandoned.

BACKGROUND OF THE INVENTION

This invention relates to improved liquid ruminant feed supplements and to processes for the production thereof. More particularly, it relates to improved growth-promoting liquid ruminant feed supplements containing stabilized antibiotics.

The use of antibiotics such as chlortetracycline and oxytetracycline for growth stimulation plus effective disease control has become commonplace in the raising of beef cattle and sheep. For this purpose, the antibiotic is commonly administered to the animals orally as a component of their normal feed ration. Since the concentration of antibiotic required in the feed ration is extremely low, it is customary to supply the substance in the form of a relatively concentrated premix of antibiotic in an edible carrier. This premix is then blended with the desired feed ration to produce the supplemented ration. Preparation of the feed ration can be accomplished by dry-mixing procedures. However, because of the importance of even distribution of the antibiotic material throughout the feed and the inherent difficulty of achieving such uniform distribution by dry-mixing procedures, an alternative method is preferably employed, wherein the antibiotic is first mixed into a liquid feed supplement, which is then absorbed upon a solid ruminant feed.

Such supplements are in widespread use and have been thought to be adequate to achieve the desired results. Experience has shown, however, that under certain conditions of storage, considerable loss of potency occurs when such supplements are stored. The reduced potency apparently results from a decomposition of the antibiotic, the exact nature of the decomposition being unknown at the present time. Loss of potency is especially marked at elevated temperatures when the supplement contains, in addition to the antibiotic, a high level of a mineral supplement such as is commonly supplied to animals. Accordingly, an antibiotic-containing liquid ruminant feed supplement of improved stability would represent a significant advance in the art.

Attempts have been made heretofore to stabilize antibiotic preparations by means of an inert coating, for example, with acid-resistant substances such as long chain saturated hydrocarbons, waxes, fatty acids and esters, etc. Czech Pat. 96,618, reported in Chemical Abstracts 55, 20339b (1961) is directed to the coating of procaine-penicillin with methyl stearate in ether solution for this purpose; the coated antibiotic is dried and then incorporated in drug and food compositions. However, when incorporated in the liquid ruminant feed supplements, the coating materials employed have not been satisfactory in protecting the antibiotic from the catalytic action of trace minerals, vitamins, etc. In addition, the coatings have interfered with the availability of the antibiotic in the normal digestive process of the animal.

SUMMARY OF THE INVENTION

In accordance with the instant invention, it has now been found that coating an antibiotic with a liquid hydrocarbon wax increases the stability of the antibiotic when incorporated in a liquid ruminant feed supplement without interfering with the availability of the antibiotic in the normal digestive process of the ruminant. An oil-in-water emulsifier is preferably incorporated in the coating to prevent any incompatibility between the coated antibiotic and the liquid feed supplement.

DETAILED DESCRIPTION OF THE INVENTION

The hydrocarbon waxes employed to coat antibiotics according to the instant invention are liquid hydrocarbon waxes, i.e., they are normally liquid at room temperature, having a melting point within the range of about 50–75° F. Typically, these waxes are derived from saturated alkanes having about 15–22 carbon atoms. Preferably, the wax will be derived from fully saturated, straight chain alkanes containing about 18–21 carbon atoms, such as L–233 wax (trademark of Pennfield Oil Company). Surprisingly, it has been found that these waxes will protect the antibiotic against trace minerals, vitamins, etc. normally found in liquid ruminant feed supplements. Furthermore, these waxes do not interfere with the availability of the antibiotic in the ruminant, as is the case with waxes having melting points substantially above room temperature.

In practicing the instant invention, a slurry of antibiotic premix in the liquid wax is prepared. A wide range of concentrations of antibiotic premix in the wax may be employed. With commercially available premixes, which usually contain about 10–50 grams of antibiotic per pound of premix, about 0.1–10 parts of wax per part of premix may be employed, resulting in about 1.0–500 parts of wax per part of actual antibiotic. Preferably, about 0.5–2 parts of wax will be employed for each part of premix.

In order to facilitate uniform mixing, the slurry may be heated up to about 110° F. The slurry of coated antibiotic is then thoroughly mixed with a liquid ruminant feed supplement to form a suspension.

An oil-in-water emulsifier is preferably incorporated in the instant coating to prevent any incompatibility in the suspension of coated antibiotic in liquid supplement. Suitable emulsifiers are those surfactants which form oil-in-water emulsions, i.e., hydrophilic surfactants having an HLB number greater than about 10 (on the HLB scale of 0–20), including hydrophilic polyoxyethylene derivatives of various phenols, common fatty acids and alcohols. Among the suitable emulsifiers are hydrophilic polyoxyethylene derivatives of sorbitan monolaurate, sorbitan monopalmitate, sorbitan mono and tristearate, sorbitan mono and trioleate, nonylphenol, i-octylphenol, lauryl alcohol, stearyl alcohol, tridecyl alcohol, and oleyl alcohol. The emulsifier might also be a mixture of hydrophilic and lipophilic emulsifiers (such as partial esters of common fatty acids) so long as there is sufficient hydrophilic emulsifier present to render the overall mixture hydrophilic. Polyoxyethylene sorbitan monooleate (polysorbate 80) is a preferred emulsifier. Normally, the amount of emulsifier incorporated in the coating will be within the range of about 3-20% by weight. The emulsifier may be incorporated either by blending it in the wax prior to coating the antibiotic, or by applying a second coat, which contains emulsifier, to previously coated antibiotic.

The instant invention provides a means of stabilizing any antibiotic which might be incorporated in liquid ruminant feed supplements. Tetracycline-type antibiotics, e.g., chlortetracycline and oxytetracycline, are most commonly used for this purpose but other antibiotics known in the art might be substituted therefor, either in whole or in part.

The liquid ruminant feed supplements in which the coated antibiotics are suspended are generally known in the art and usually contain water, a phosphorus source, trace minerals, urea and/or molasses and fat. It is particularly advantageous to utilize the instant coated antibiotic in liquid ruminant feed supplements of the type described in application of Snyder et al., Ser. No. 479,324, filed Aug. 12, 1965, now abandoned, wherein aqueous partially ammoniated superphosphoric acid having a pH of about 6 is employed as nitrogen, and phosphorus source. The use of this supplement, which solubilizes trace minerals, in connection with the instant invention provides excellent results.

While the instant method of coating antibiotics is most advantageously employed as a means for stabilizing the antibiotic against water, minerals, vitamins and other components of liquid ruminant feed supplements, its benefits are not limited to this specific use. The coated antibiotics are also suitable for use in dry feeds and other situations where stability against oxidation, hydrolysis, etc. is required.

The following examples are provided to illustrate the instant invention more fully. They are provided for illustrative purposes only and are not to be construed as limiting the invention, which is defined by the appended claims.

Example I

A steam-jacketed makeup vessel equipped for agitation is charged with 150 grams of liquid hydrocarbon wax having a melting point of 55° F. (L-233 of Pennfield Oil Company). The agitation is started and steam is admitted into the jacket to heat the wax to 75° F. About 7 grams of polysorbate 80, a commercially available polyoxyethylene sorbitan mono-oleate emulsifier, is dissolved in the wax and then 150 grams of commercially available oxytetracycline premix, containing 50 grams of antibiotic per pound of premix, is added. Stirring is continued until a uniform slurry is obtained, which is then slowly added to a mixer precharged with 200 pounds of a liquid ruminant feed supplement containing a high level of minerals. Further mixing for about 5 minutes provides a high-mineral liquid feed supplement suitable for incorporation into a complete cattle feed ration at a rate to provide 70-140 milligrams of oxytetracycline per head daily.

Example II

A steam-jacketed makeup vessel equipped for agitation is charged with 60 grams of L-233 liquid wax, which is heated to 75° F. Agitation is started and 128 grams of commercially available chlortetracycline premix, containing 50 grams of antibiotic per pound of premix, is added.

In another vessel, 60 grams of the wax is blended with 4 grams of polysorbate 80 at 75° F. Agitation is continued for 2 minutes at 75° F. after addition of the emulsifier to provide a uniform blend.

The contents of the two vessels are mixed and thoroughly blended, and the resulting mixture is incorporated into 200 pounds of liquid ruminant feed supplement to provide a supplement containing 70 milligrams of chlortetracycline per pound of supplement and having the following overall composition.

| Component: | Pounds |
| --- | --- |
| Molasses | 100.0 |
| Urea | 24.5 |
| Salt | 10.0 |
| $Na_2SO_4$ | 10.0 |
| Water | 40.7 |
| Trace minerals | 1.3 |
| Ammonium phosphate [1] | 13.5 |
| Antibiotic (as 100%) | 0.03 |
| Vitamins | 0.04 |

[1] In the form of aqueous partially ammoniated superphosphoric acid having a pH of about 6 to solubilize trace minerals.

This high-mineral feed supplement is suitable for incorporation into a complete cattle feed ration at a rate to provide 70 to 140 milligrams of chlortetracycline per head daily.

Example III

The improved stability of the compositions provided by this invention has been demonstrated in laboratory and field tests with materials stored at normal and slightly elevated temperatures. Tables 1 and 2 show the results of antibiotic potency determinations after storage of cattle feed supplements containing a high level of minerals. In the tables, potency is expressed as a percentage of the initial antibiotic content.

TABLE 1.—POTENCY OF LIQUID FEED SUPPLEMENT WITH WAX-COATED ANTIBIOTIC

| Storage time, days | Percent | | | |
| --- | --- | --- | --- | --- |
| | Chlortetracycline, 64 mg. per pound of supplement | | Oxytetracycline, 61 mg. per pound of supplement | |
| | 69° F. | 110° F. | 69° F. | 110° F. |
| 2 | 96 | 96 | 94 | 94 |
| 6 | 93 | 91 | 93 | 92 |
| 10 | 87 | 77 | 88 | 81 |
| 12 | 83 | 69 | 85 | 77 |
| 15 | 81 | 66 | 86 | 75 |
| 20 | 76 | 59 | 82 | 71 |
| 22 | 75 | | 71 | 68 |
| 27 | 69 | | 66 | 63 |

TABLE 2.—POTENCY OF LIQUID FEED SUPPLEMENT WITH UNCOATED ANTIBIOTIC

| Storage time, days | Percent | | | |
| --- | --- | --- | --- | --- |
| | Chlortetracycline, 68 mg. per pound of supplement | | Oxytetracycline, 71 mg. per pound of supplement | |
| | 69° F. | 110° F. | 69° F. | 110°F. |
| 3 | 84 | 79 | 90 | 89 |
| 6 | 63 | 50 | 81 | 78 |
| 10 | | | 76 | 71 |

What is claimed is:

1. An improved liquid ruminant feed supplement containing an antibiotic premix slurry heated up to about 110° F., said antibiotic subject to loss of potency when the supplement contains, in addition to the antibiotic, water, urea and/or molasses and fat, salt, $Na_2SO_4$, vitamins, and trace minerals solubilized with aqueous partially ammoniated superphosphoric acid having a pH of about 6 employed as a nitrogen and phosphorus source which solubilizes trace minerals, coated with a molten blend of about 3 to about 20% by weight of a hydrophilic oil-in-water emulsifier surfactant having an HLB of from about 10-20 functioning to increase the effectiveness of the antibiotic in the rumen and incorporated in liquid hydrocarbon wax, normally liquid at room temperature, which does not interfere with the availability of the antibiotic in the ruminant as is the case with waxes having melting points substantially above room temperature, said liquid hydrocarbon wax having a melting point within the range of about 50-75° F. and being derived from fully saturated alkanes containing between about 15 and 22 carbon atoms.

2. The improved feed supplement of claim 1 wherein said liquid hydrocarbon wax is derived from fully saturated, straight chain alkanes containing between about 18 and 21 carbon atoms.

3. The improved feed supplement of claim 1 wherein said coating contains about 1.0–500 parts of liquid hydrocarbon wax per part of antibiotic.

4. The improved feed supplement of claim 1 wherein said emulsifier is a polyoxyethylene sorbitan monostearate.

5. The improved feed supplement of claim 1 wherein said antibiotic is chlortetracycline or oxytetracycline.

References Cited

UNITED STATES PATENTS

| | | | |
|---|---|---|---|
| 2,777,798 | 1/1957 | Hochberg et al. | 424—38 |
| 2,805,977 | 9/1957 | Robinson et al. | 424—38 XR |
| 2,875,130 | 2/1959 | Grass et al. | 424—38 XR |
| 2,890,980 | 6/1959 | Hotchkiss et al. | 424—38 XR |
| 2,902,407 | 9/1959 | Gross et al. | 424—38 |
| 2,951,014 | 8/1960 | Garman | 424—227 |
| 2,956,926 | 10/1960 | Greif | 424—227 XR |
| 3,078,216 | 2/1963 | Greif | 424—38 XR |
| 3,108,046 | 10/1963 | Harbit | 424—227 XR |
| 3,265,629 | 8/1966 | Jensen | 424—38 XR |

SHEP K. ROSE, Primary Examiner

U.S. Cl. X.R.

99—2; 424—227